(12) United States Patent
Liao et al.

(10) Patent No.: US 11,169,420 B1
(45) Date of Patent: Nov. 9, 2021

(54) LIQUID CRYSTAL DISPLAY PANEL

(71) Applicant: TCL CHINA STAR OPTOELECTRONICS TECHNOLOGY CO., LTD., Shenzhen (CN)

(72) Inventors: Dong Liao, Shenzhen (CN); Bai Bai, Shenzhen (CN); Guo Zhao, Shenzhen (CN)

( * ) Notice: Subject to any disclaimer, the term of this patent is extended or adjusted under 35 U.S.C. 154(b) by 204 days.

(21) Appl. No.: 16/627,809

(22) PCT Filed: Dec. 26, 2019

(86) PCT No.: PCT/CN2019/128786
§ 371 (c)(1),
(2) Date: Dec. 31, 2019

(87) PCT Pub. No.: WO2021/120279
PCT Pub. Date: Jun. 24, 2021

(30) Foreign Application Priority Data

Dec. 19, 2019 (CN) .......................... 201911320160.3

(51) Int. Cl.
*G02F 1/1339* (2006.01)
*G02F 1/1335* (2006.01)
*G02F 1/1345* (2006.01)

(52) U.S. Cl.
CPC ........ *G02F 1/1339* (2013.01); *G02F 1/13454* (2013.01); *G02F 1/133512* (2013.01); *G02F 1/133514* (2013.01)

(58) Field of Classification Search
CPC .................................................... G02F 1/1339
See application file for complete search history.

(56) References Cited

U.S. PATENT DOCUMENTS

| | | | |
|---|---|---|---|
| 2014/0340625 A1 | 11/2014 | Hsu et al. | |
| 2015/0364722 A1* | 12/2015 | Yang | H01L 51/5246 257/40 |
| 2017/0293170 A1 | 10/2017 | Miyawaki et al. | |
| 2020/0057325 A1* | 2/2020 | Wang | G02F 1/1339 |

FOREIGN PATENT DOCUMENTS

| | | |
|---|---|---|
| CN | 202330959 U | 7/2012 |
| CN | 103472607 A | 12/2013 |
| CN | 104267526 A | 1/2015 |
| CN | 104730774 A | 6/2015 |
| CN | 105549272 A | 5/2016 |
| JP | 2008250120 A | 10/2008 |

* cited by examiner

Primary Examiner — Edmond C Lau

(57) ABSTRACT

A liquid crystal display (LCD) panel is provided. The LCD panel includes a first sub-sealant and a second sub-sealant arranged in a region where a gate driver on array (GOA) circuit is placed. The first sub-sealant is closer to a display region than the second sub-sealant. Material of the first sub-sealant has stronger adhesion than material of the second sub-sealant. The material of the first sub-adhesive has lower water resistance than the material of the second sub-sealant.

18 Claims, 1 Drawing Sheet

LIQUID CRYSTAL DISPLAY PANEL

FIELD OF DISCLOSURE

The present invention relates to a field of display technology and in particular, to a liquid crystal display (LCD) panel.

DESCRIPTION OF RELATED ART

With development of thin film transistor liquid crystal displays (TFT-LCD), requirements for narrow-bezel displays are higher and higher. In order to further reduce a width of a bezel of a display, a most common method in the industry is to fabricate a gate driver on array (GOA) circuit on a TFT substrate. This way, a gate driver integrated circuit (IC) is not required, and the bezel can be made very narrow. A bezel of a display device using a gate driver IC is generally more than 5 mm, while a bezel of a display device using the GOA circuit on the TFT substrate is generally less than 3 mm. At present, a small-size GOA liquid crystal display product generally has a structure that the array substrate and the color filter substrate are bonded by a layer of sealant therebetween to prevent internal liquid crystal molecules from leaking. In order to improve display quality and ensure long-term product reliability, it is preferable that the sealant meet requirements such as good adhesion, and no bubbles generated at interfaces during transportation, and good water-resistant properties to prevent entry of moisture to cause electrical failures under high temperature and high humidity environment. However, when the sealant is used in GOA liquid crystal display products, moisture easily causes corrosion and defects of horizontal lines at holes for arranging clock signal lines. Therefore, positions where sealant is applied in the GOA liquid crystal display products are limited, and the sealant should avoid the holes for arranging the clock signal lines in the liquid crystal display products.

In summary, when the sealant for conventional liquid crystal display panels is used in the GOA liquid crystal display products, moisture easily causes corrosion and defects of horizontal lines at the holes for arranging the clock signal lines, so short circuits may occur in the GOA circuit and affect the display quality of the liquid crystal display panel.

When sealant for conventional liquid crystal display panels is used in gate driver on array (GOA) liquid crystal display products, moisture easily causes corrosion and defects of horizontal lines at holes for arranging clock signal lines, so short circuits may occur in a GOA circuit and affect the display quality of liquid crystal display panel.

SUMMARY

The present invention provides a liquid crystal display (LCD) panel, comprising:

an array substrate and a color filter substrate disposed opposite to each other and a liquid crystal layer sandwiched between the array substrate and the color filter substrate, wherein the array substrate and the color filter substrate are bonded by a sealant, the LCD panel comprises a display region and a gate driver on array (GOA) circuit arranged outside the display region, and the sealant is formed in a region where the GOA circuit is disposed;

wherein the sealant comprises a first sub-sealant and a second sub-sealant, the first sub-sealant is closer to the display region than the second sub-sealant, and the first sub-sealant is adhered to the second sub-sealant; and wherein material of the first sub-sealant has stronger adhesion than material of the second sub-sealant, and the material of the first sub-adhesive has lower water resistance than the material of the second sub-sealant.

In the liquid crystal display panel, the GOA circuit is disposed on the array substrate, and the GOA circuit comprises a resonance signal line, a clock signal line, and a common electrode line.

In the liquid crystal display panel, the resonance signal line, the clock signal line, and the common electrode line are sequentially arranged along a direction away from the display region.

In the liquid crystal display panel, the first sub-sealant is formed in a region where the clock signal line is disposed, and the second sub-sealant is formed in a region where the common electrode line is disposed.

In the liquid crystal display panel, the material of the first sub-sealant comprises an ultraviolet (UV) curable adhesive or epoxy resin, and the material of the second sub-sealant comprises epoxy resin.

In the liquid crystal display panel, viscosity of the first sub-sealant is greater than 100,000 Pa*s, and viscosity of the second sub-sealant is less than 50,000 Pa*s.

In the liquid crystal display panel, the water resistance of the second sub-sealant is greater than 80%.

In the liquid crystal display panel, the first sub-sealant and the second sub-sealant are cured with a same ultraviolet curing condition and a same thermal curing condition.

In the liquid crystal display panel, a first substrate, a black matrix, and a pixel electrode are disposed in a region where the GOA circuit is disposed on the color filter substrate, and the sealant is in contact with the pixel electrode.

The present invention further provides a liquid crystal display (LCD) panel, comprising:

an array substrate and a color filter substrate disposed opposite to each other and a liquid crystal layer sandwiched between the array substrate and the color filter substrate, wherein the array substrate and the color filter substrate are bonded by a sealant, the LCD panel comprises a display region and a gate driver on array (GOA) circuit arranged outside the display region, and the sealant is formed in a region where the GOA circuit is disposed;

wherein the sealant comprises a first sub-sealant and a second sub-sealant, and the first sub-sealant is closer to the display region than the second sub-sealant; and wherein material of the first sub-sealant has stronger adhesion than material of the second sub-sealant, and the material of the first sub-sealant has lower water resistance than the material of the second sub-sealant.

In the liquid crystal display panel, the GOA circuit is disposed on the array substrate, and the GOA circuit comprises a resonance signal line, a clock signal line, and a common electrode line.

In the liquid crystal display panel, the resonance signal line, the clock signal line, and the common electrode line are sequentially arranged along a direction away from the display region.

In the liquid crystal display panel, the first sub-sealant is formed in a region where the clock signal line is disposed, and the second sub-sealant is formed in a region where the common electrode line is disposed.

In the liquid crystal display panel, the material of the first sub-sealant comprises ultraviolet curable adhesive or epoxy resin, and the material of the second sub-sealant comprises epoxy resin.

In the liquid crystal display panel, viscosity of the first sub-sealant is greater than 100,000 Pa*s, and viscosity of the second sub-sealant is less than 50,000 Pa*s.

In the liquid crystal display panel, the water resistance of the second sub-sealant is greater than 80%.

In the liquid crystal display panel, the first sub-sealant and the second sub-sealant are cured with a same ultraviolet curing condition and a same thermal curing condition.

In the liquid crystal display panel, a first substrate, a black matrix, and a pixel electrode are disposed in a region where the GOA circuit is disposed on the color filter substrate, and the sealant is in contact with the pixel electrode.

Compared to conventional techniques, the present invention provides a liquid crystal display (LCD) panel. In the region where the GOA circuit is disposed, the first sub-sealant with strong adhesion and the second sub-sealant with good water resistance are applied, thereby solving a reliability problem of GOA liquid crystal display products due to corrosion by moisture and also facilitating a narrow-bezel design.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work.

DETAILED DESCRIPTION OF EMBODIMENTS

The present invention provides a liquid crystal display (LCD) panel. Technical solutions of the present invention will be clearly and completely described below with reference to specific embodiments and the accompanying drawings. It is apparent that the embodiments are for illustrative purposes only and not intended to limit the present invention.

Figure 1:
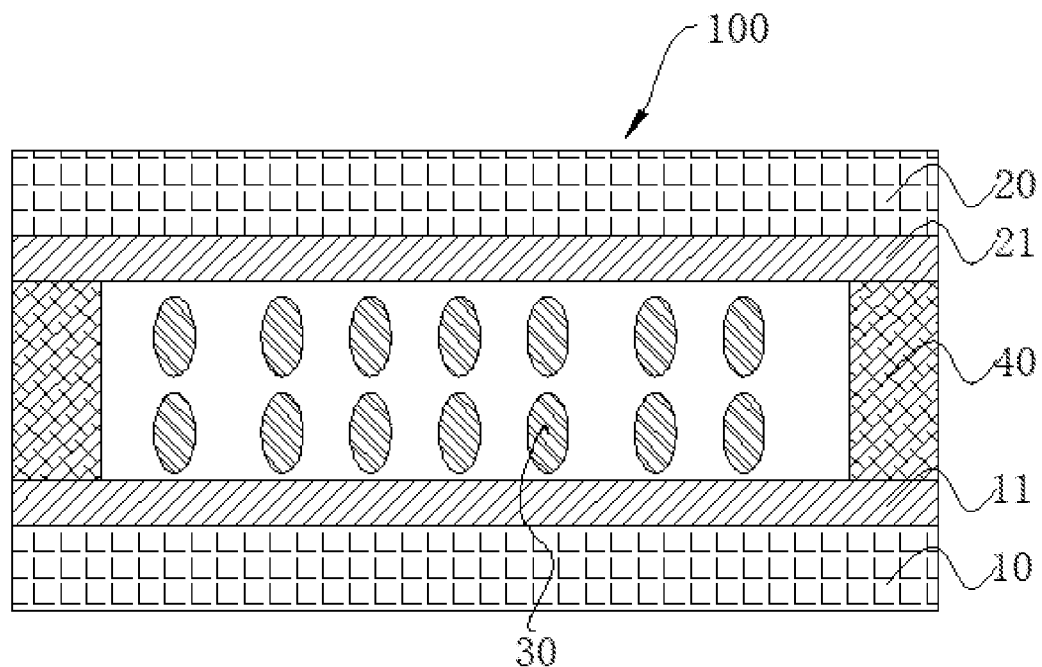
FIG. 1 is a schematic structural view illustrating a liquid crystal display (LCD) panel according to one embodiment of the present invention.

Referring to FIG. 1, it is a schematic structural view illustrating the LCD panel according to one embodiment of the present invention. The LCD panel 100 comprises an array substrate 10 and a color filter substrate 20 parallel to each other, and a liquid crystal layer 30 is disposed between the array substrate 10 and the color filter substrate 20. Two ends of the array substrate 10 and two ends of the color filter substrate 20 are bonded by a sealant 40.

In detail, the array substrate 10 is provided with a TFT array structure layer and a gate driver on array (GOA) circuit. A color filter layer, a black matrix, and a pixel electrode are disposed on the color filter substrate 20. Preferably, the pixel electrode is made of ITO (indium tin oxide). A first alignment layer 11 is disposed on the array substrate 10, and a second alignment layer 21 is disposed on the color filter substrate 20. The first alignment layer 11 and the second alignment layer 21 are preferably made of polyimide.

Preferably, the first alignment layer 11 and the second alignment layer 21 are vertical alignment layers. Further, the first alignment layer 11 and the second alignment layer 21 are both a photo-alignment layer. When ultraviolet light is used to irradiate the photo-alignment layer, a predetermined tilted angle is formed, so rotation directions of liquid crystal molecules in the liquid crystal layer 30 are more consistent.

In detail, the liquid crystal layer 30 comprises the liquid crystal molecules, a photo-initiator, and a polymerizable monomer that can undergo a polymerization reaction under irradiation of ultraviolet light. The liquid crystal molecules are nematic liquid crystal molecules and have a negative dielectric anisotropy constant. The sealant 40 can effectively bond the array substrate 10 and the color filter substrate 20 to each other.

Figure 2:
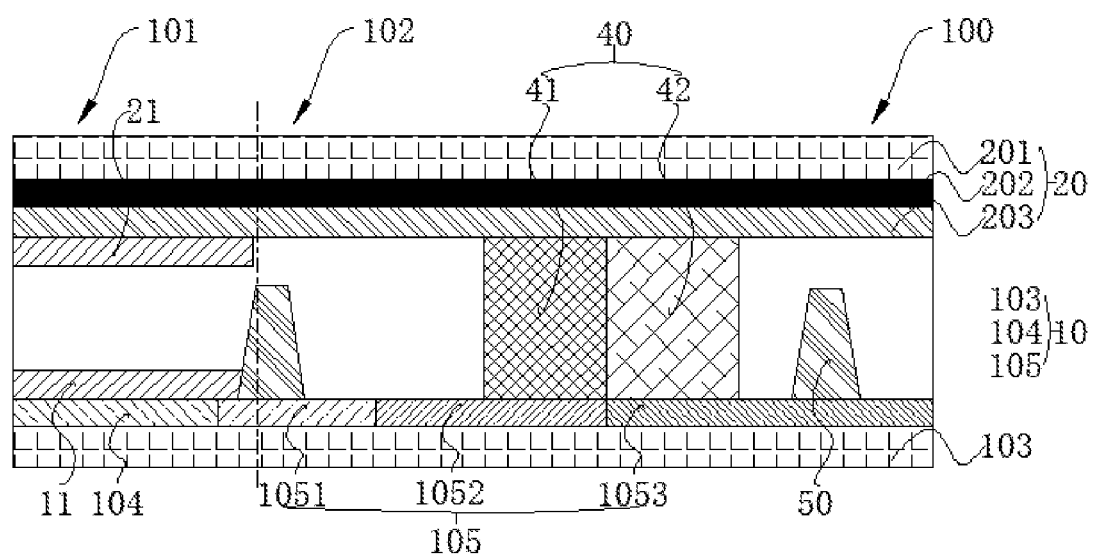
FIG. 2 is a schematic structural view illustrating a gate driver on array (GOA) circuit in the LCD panel according to one embodiment of the present invention.

As shown in FIG. 2 and FIG. 1, FIG. 2 is a schematic structural view illustrating a gate driver on array (GOA) circuit in the LCD panel 100 according to one embodiment of the present invention. The LCD panel 100 comprises a display region 101 and a non-display region 102 outside the display region 101. The GOA circuit 105 is arranged in the non-display region 102.

In detail, the GOA circuit 105 is disposed on one side of the LCD panel 100 adjacent to the array substrate 10. The array substrate 10 comprises a second substrate 103, and a TFT array structure layer 104 and a GOA circuit 105 disposed in a same layer on the second substrate 103. The TFT array structure layer 104 is disposed in the display region 101.

The sealant 40 is formed in a region where the GOA circuit 105 is disposed. The sealant 40 comprises a first sub-sealant 41 and a second sub-sealant 42, the first sub-sealant 41 is closer to the display region 101 than the second sub-sealant 42. Material of the first sub-sealant 41 has stronger adhesion than material of the second sub-sealant 42, and the material of the first sub-adhesive 41 has lower water resistance than the material of the second sub-sealant 42.

The first sub-sealant 41 is adhered to the second sub-sealant 42. With the first sub-sealant 41 and the second sub-sealant 42 in contact with each other, the present invention prevents a gap from being formed between the first sub-sealant 41 and the second sub-sealant 42 of different materials, thereby improving structural rigidity of the LCD panel 100 and preventing entry of external impurities from between the first sub-sealant 41 and the second sub-sealant 42.

In detail, the GOA circuit 105 comprises a resonance signal line 1051 (LC), a clock signal line (CK) 1052, and a common electrode line 1053 (Acom, i.e., a common electrode on one side of the array substrate 10). The resonance signal line 1051, the clock signal line 1052, and the common electrode line 1053 are sequentially arranged along a direction away from the display region 101.

Preferably, the first sub-sealant 41 is formed in a region where the clock signal line 1052 is disposed, and the second sub-sealant 42 is formed in a region where the common electrode line 1053 is disposed. Material of the first sub-sealant 41 comprises an ultraviolet (UV) curable adhesive or epoxy resin, and material of the second sub-sealant 42 comprises epoxy resin.

Viscosity of the first sub-sealant is greater than 100,000 Pa*s, and viscosity of the second sub-sealant is less than 50,000 Pa*s. Here, the viscosity generally refers to a resistance generated when two regions of one square meter each are taken in the sealant at normal temperature (generally 25° C.), spaced apart by one meter, and moved in a relative speed of 1 m/s, and unit of viscosity is Pa*s.

Preferably, the water resistance of the second sub-sealant 42 is greater than 80%. The water resistance generally refers to a proportion of water that does not pass through a material per unit time to the total water at one atmosphere of pressure and normal temperature (generally is 25° C.).

In detail, the first sub-sealant 41 and the second sub-sealant 42 are cured with a same ultraviolet curing condition and a same thermal curing condition. A light absorption amount in the ultraviolet curing condition and a thermal curing time in the thermal curing condition must first satisfy a narrower one of the first sub-sealant 41 and the second sub-sealant 42, so as to ensure that the first sub-sealant 41 and the second sub-sealant 42 are both cured.

The LCD panel 100 is further provided with a plurality of isolation pillars 50 disposed on one side of the array substrate 10. The isolation pillars 50 are respectively arranged on the resonance signal line 1051 and the common electrode line 1053. The isolation pillars 50 may be made of polyimide by photolithography or printing.

A first substrate 201, a black matrix 202, and a pixel electrode 203 are disposed in a region where the GOA circuit 105 is disposed on the color filter substrate 20, and the sealant 40 is in contact with the pixel electrode 203.

Because the material of the first sub-sealant 41 has stronger adhesion, and the material of the second sub-sealant 42 has higher water resistance, the clock signal line 1052 is protected from external moisture to thereby solve problems that a conventional sealant is difficult to provide adhesion and water resistance at the same time. Accordingly, the present invention solves a poor reliability problem of GOA liquid crystal display products resulting from entry of moisture, facilitates a narrow-bezel design, improves product quality, and enhances competitiveness.

In summary, the present application provides the LCD panel. In a region where a GOA circuit is disposed, the first sub-sealant with strong adhesion and the second sub-sealant with strong water resistance are applied. The present invention solves a poor reliability problem caused by entry of moisture into GOA liquid crystal display products, and facilitates a narrow-bezel design.

For those of ordinary skill in the art, equivalent replacements or changes may be made according to the technical solution of the present application and its inventive concept, and all these changes or replacements shall fall within the protection scope of the appended claims of the present application.

What is claimed is:

1. A liquid crystal display (LCD) panel, comprising:
an array substrate and a color filter substrate disposed opposite to each other and a liquid crystal layer sandwiched between the array substrate and the color filter substrate, wherein the array substrate and the color filter substrate are bonded by a sealant, the LCD panel comprises a display region and a gate driver on array (GOA) circuit arranged outside the display region, and the sealant is formed in a region where the GOA circuit is disposed;
wherein the sealant comprises a first sub-sealant and a second sub-sealant, the first sub-sealant is closer to the display region than the second sub-sealant, and the first sub-sealant is adhered to the second sub-sealant; and
wherein material of the first sub-sealant has stronger adhesion than material of the second sub-sealant, and the material of the first sub-adhesive has lower water resistance than the material of the second sub-sealant.

2. The LCD panel according to claim 1, wherein the GOA circuit is disposed on the array substrate, and the GOA circuit comprises a resonance signal line, a clock signal line, and a common electrode line.

3. The LCD panel according to claim 2, wherein the resonance signal line, the clock signal line, and the common electrode line are sequentially arranged along a direction away from the display region.

4. The LCD panel according to claim 3, wherein the first sub-sealant is formed in a region where the clock signal line is disposed, and the second sub-sealant is formed in a region where the common electrode line is disposed.

5. The LCD panel according to claim 1, wherein the material of the first sub-sealant comprises an ultraviolet (UV) curable adhesive or epoxy resin, and the material of the second sub-sealant comprises epoxy resin.

6. The LCD panel according to claim 5, wherein viscosity of the first sub-sealant is greater than 100,000 Pa*s, and viscosity of the second sub-sealant is less than 50,000 Pa*s.

7. The LCD panel according to claim 5, wherein the water resistance of the second sub-sealant is greater than 80%.

8. The LCD panel according to claim 1, wherein the first sub-sealant and the second sub-sealant are cured with a same ultraviolet curing condition and a same thermal curing condition.

9. The LCD panel according to claim 1, wherein a first substrate, a black matrix, and a pixel electrode are disposed in a region where the GOA circuit is disposed on the color filter substrate, and the sealant is in contact with the pixel electrode.

10. A liquid crystal display (LCD) panel, comprising:
an array substrate and a color filter substrate disposed opposite to each other and a liquid crystal layer sandwiched between the array substrate and the color filter substrate, wherein the array substrate and the color filter substrate are bonded by a sealant, the LCD panel comprises a display region and a gate driver on array (GOA) circuit arranged outside the display region, and the sealant is formed in a region where the GOA circuit is disposed;
wherein the sealant comprises a first sub-sealant and a second sub-sealant, and the first sub-sealant is closer to the display region than the second sub-sealant; and
wherein material of the first sub-sealant has stronger adhesion than material of the second sub-sealant, and the material of the first sub-sealant has lower water resistance than the material of the second sub-sealant.

11. The LCD panel according to claim 10, wherein the GOA circuit is disposed on the array substrate, and the GOA circuit comprises a resonance signal line, a clock signal line, and a common electrode line.

12. The LCD panel according to claim 11, wherein the resonance signal line, the clock signal line, and the common electrode line are sequentially arranged along a direction away from the display region.

13. The LCD panel according to claim 12, wherein the first sub-sealant is formed in a region where the clock signal line is disposed, and the second sub-sealant is formed in a region where the common electrode line is disposed.

14. The LCD panel according to claim 10, wherein the material of the first sub-sealant comprises ultraviolet curable adhesive or epoxy resin, and the material of the second sub-sealant comprises epoxy resin.

15. The LCD panel according to claim 14, wherein viscosity of the first sub-sealant is greater than 100,000 Pa*s, and viscosity of the second sub-sealant is less than 50,000 Pa*s.

16. The LCD panel according to claim 14, wherein the water resistance of the second sub-sealant is greater than 80%.

17. The LCD panel according to claim 10, wherein the first sub-sealant and the second sub-sealant are cured with a same ultraviolet curing condition and a same thermal curing condition.

18. The LCD panel according to claim 10, wherein a first substrate, a black matrix, and a pixel electrode are disposed in a region where the GOA circuit is disposed on the color filter substrate, and the sealant is in contact with the pixel electrode.

\* \* \* \* \*